United States Patent
Aiba

(10) Patent No.: US 8,241,754 B2
(45) Date of Patent: Aug. 14, 2012

(54) BARRIER LAMINATE AND DEVICE SEALED WITH IT, AND METHOD OF SEALING DEVICE

(75) Inventor: Satoshi Aiba, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 598 days.

(21) Appl. No.: 12/343,911

(22) Filed: Dec. 24, 2008

(65) Prior Publication Data

US 2009/0169906 A1 Jul. 2, 2009

(30) Foreign Application Priority Data

Dec. 27, 2007 (JP) .................................. 2007-337414

(51) Int. Cl.
- B32B 27/00 (2006.01)
- B32B 9/00 (2006.01)
- B29C 65/00 (2006.01)
- C23C 16/00 (2006.01)

(52) U.S. Cl. ........ 428/500; 428/688; 156/60; 427/255.6

(58) Field of Classification Search .................. 428/500, 428/688; 156/60; 427/255.6
See application file for complete search history.

(56) References Cited

U.S. PATENT DOCUMENTS

2007/0231592 A1* 10/2007 Agata ........................... 428/522

FOREIGN PATENT DOCUMENTS

| JP | 2003-335820 A | 11/2003 |
|---|---|---|
| JP | 2003-335880 A | 11/2003 |
| JP | 2004-9395 A | 1/2004 |
| JP | 2005-7741 A | 1/2005 |
| JP | 2005-254795 A | 9/2005 |
| JP | 2007-290369 A | 11/2007 |

OTHER PUBLICATIONS

Japanese Office Action (with English Translation) dated May 11, 2010 issued in Japanese Application No. JP 2008-049576.
U.S Office Action for U.S. Appl. No. 12/343,895 dated Jul. 20, 2011.
Japanese Office Action with the English translation dated Nov. 29, 2011, for Application No. 2007-337414.

* cited by examiner

*Primary Examiner* — William Cheung
(74) *Attorney, Agent, or Firm* — Birch, Stewart, Kolasch & Birch, LLP

(57) ABSTRACT

Disclosed is a barrier laminate comprising at least one organic layer and at least one inorganic layer, wherein the organic layer is formed by vacuum vapor deposition of a composition containing a radical-polymerizing monomer and a polymerization initiator, followed by curing the composition, and the polymerization initiator is liquid at 30° C. under one atmosphere and/or has a melting point of not higher than 30° C.

7 Claims, No Drawings

BARRIER LAMINATE AND DEVICE SEALED WITH IT, AND METHOD OF SEALING DEVICE

FIELD OF THE INVENTION

The present invention relates to a barrier laminate and a device sealed with a barrier laminate, and to a method for sealing a device with a barrier laminate. In particular, the invention relates to sealing of an electronic device such as an organic EL device.

BACKGROUND OF THE INVENTION

Heretofore investigated is sealing of a device such as an organic EL device. One sealing method of the type comprises forming a barrier layer that comprises an organic layer and an inorganic layer, on the surface of a device. After a protective layer and an adhesive layer are formed on the surface of a device, such a barrier layer also may be formed thereon. In forming the organic layer of the barrier laminate, a method is widely employed, comprising applying in layer a composition containing a polymerizing monomer and a polymerization initiator, on the surface of a device by vacuum vapor deposition or coating thereon, followed by curing the composition.

On the other hand, for securing the barrier property thereof, widely investigated is a gas-barrier film that has a barrier laminate formed on a substrate film. For example, in JP-A 10-278167, JP-A 2003-335820 and JP-A 2004-9395, the organic layer is formed by applying in layer a composition containing a polymerizing monomer such as an acrylic monomer and a polymerization initiator, on the surface of a substrate by vacuum vapor deposition or coating thereon, followed by curing the composition.

However, when the organic layer-having barrier laminate described in these references is used as a barrier laminate for sealing the above-mentioned device, then the unreacted polymerizing monomer and polymerization initiator may much remain in the organic layer after formation of the organic layer, and the gas derived from these may be released into the adjacent inorganic layer and even into the device body, thereby causing damage to the inorganic layer, the device and the like. In particular, the polymerizing monomer and the polymerization initiator may evaporate during film formation, and the inorganic layer may be thereby defoamed and broken and may fail in suitable sealing, and there may occur a serious problem in that the properties of the sealed device may worsen.

SUMMARY OF THE INVENTION

The invention is to solve the problems, and its object is to provide a barrier laminate capable of being produced through vacuum vapor deposition that has less damage to inorganic layer and device, and that can favorably seal a device such as an organic EL device.

Given the situation as above, the present inventors have assiduously studied and, as a result, have found that the above problems can be solved by the following means:

(1) A barrier laminate comprising at least one organic layer and at least one inorganic layer, wherein the organic layer is formed by vacuum vapor deposition of a composition containing a radical-polymerizing monomer and a polymerization initiator, which is liquid at 30° C. under one atmosphere, followed by curing the composition.

(2) A barrier laminate comprising at least one organic layer and at least one inorganic layer, wherein the organic layer is formed by vacuum vapor deposition of a composition containing a radical-polymerizing monomer and a polymerization initiator having a melting point of not higher than 30° C., followed by curing the composition.

(3) The barrier laminate of (1) or (2), wherein the molecular weight of the polymerization initiator is at least 170.

(4) The barrier laminate of any one of (1) to (3), wherein the composition contains the polymerization initiator in a ratio of at most 2% by weight.

(5) The barrier laminate of any one of (1) to (4), wherein the polymerization initiator contains at least one compound of the following general formula (1):

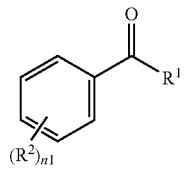

(1)

(wherein $R^1$ represents a substituted or unsubstituted alkyl group having from 1 to 18 carbon atoms, a substituted or unsubstituted aryl group having from 1 to 18 carbon atoms, a carbonyl group, or a substituent comprising any two or more such groups bonding to each other; $R^2$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n1 indicates an integer of from 0 to 5; when n1 is 2 or more, $R^2$'s may be the same or different).

(6) The barrier laminate of any one of (1) to (4), wherein the polymerization initiator contains at least one compound of the following general formula (2):

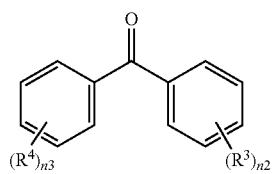

(2)

(wherein $R^3$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; $R^4$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n2 and n3 each indicate an integer of from 0 to 5, but both n2 and n3 are not 0 at the same time; when n2 is 2 or more, $R^3$'s may be the same or different; and when n3 is 2 or more, $R^4$'s may be the same or different).

(7) The barrier laminate of any one of (1) to (6), wherein the organic layer is formed by flash vapor deposition.

(8) The barrier laminate of any one of (1) to (7), wherein the radical-polymerizing monomer constituting the organic layer is at least one selected from compounds of the following general formula (4):

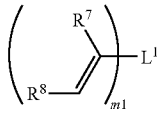

(4)

(wherein $R^7$ represents a hydrogen atom or a methyl group; $R^8$ represents a hydrogen atom; $L^1$ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m1 indicates an integer of from 1 to 6; when m1 is 2 or more, $R^7$'s and $R^8$'s each may be the same or different).

(9) The barrier laminate of any one of (1) to (7), wherein the radical-polymerizing monomer constituting the organic layer is at least one selected from compounds of the following general formula (5):

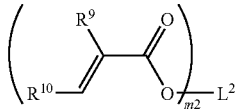

(5)

(wherein $R^9$ represents a hydrogen atom or a methyl group; $R^{10}$ represents a hydrogen atom; $L^2$ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m2 indicates an integer of from 1 to 6; when m2 is 2 or more, $R^9$'s and $R^{10}$'s each may be the same or different).

(10) A device sealed with a barrier laminate of any one of (1) to (9).

(11) The device of (10), which is an organic EL device.

(12) A method for sealing a device, comprising providing a barrier laminate of any one of (1) to (9) on the surface of a device.

(13) A method for sealing a device comprising providing at least one organic layer and at least one inorganic layer on the surface of a device, wherein the organic layer is formed by vacuum vapor deposition of a composition containing a radical-polymerizing monomer and a polymerization initiator having a melting point of not higher than 30° C., followed by curing the composition.

(14) A method for sealing a device comprising providing at least one organic layer and at least one inorganic layer on the surface of a device, wherein the organic layer is formed by vacuum vapor deposition of a composition containing a radical-polymerizing monomer and a polymerization initiator, which is liquid at 30° C. under one atmosphere, followed by curing the composition.

(15) The method for sealing a device of (13) or (14), wherein a polymerization initiator having a molecular weight of at least 170 is used.

(16) The method for sealing a device of any one of (13) to (15), wherein the composition contains the polymerization initiator in a ratio of at most 2% by weight.

(17) The method for sealing a device of any one of (13) to (16), wherein at least one compound of the following general formula (1) is used as the polymerization initiator:

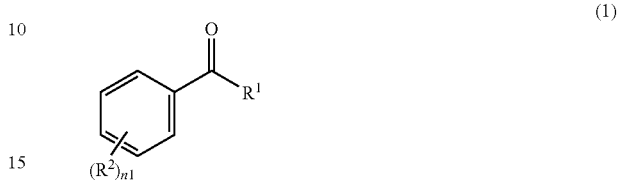

(1)

(wherein $R^1$ represents a substituted or unsubstituted alkyl group having from 1 to 18 carbon atoms, a substituted or unsubstituted aryl group having from 1 to 18 carbon atoms, a carbonyl group, or a substituent comprising any two or more such groups bonding to each other; $R^2$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n1 indicates an integer of from 0 to 5; when n1 is 2 or more, $R^2$'s may be the same or different).

(18) The method for sealing a device of any one of (13) to (16), wherein at least one compound of the following general formula (2) is used as the polymerization initiator:

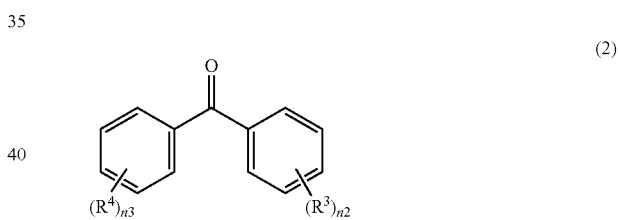

(2)

(wherein $R^3$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; $R^4$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n2 and n3 each indicate an integer of from 0 to 5, but both n2 and n3 are not 0 at the same time; when n2 is 2 or more, $R^3$'s may be the same or different; and when n3 is 2 or more, $R^4$'s may be the same or different).

(19) The method for sealing a device of any one of (13) to (18), wherein the organic layer is formed by flash vapor deposition.

(20) The method for sealing a device of any one of (13) to (19), wherein the radical-polymerizing monomer constituting the organic layer is at least one selected from compounds of the following general formula (4):

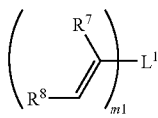

(wherein R⁷ represents a hydrogen atom or a methyl group; R⁸ represents a hydrogen atom; L¹ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m1 indicates an integer of from 1 to 6; when m1 is 2 or more, R⁷'s and R⁸'s each may be the same or different).

(21) The method for sealing a device of any one of (13) to (19), wherein the radical-polymerizing monomer constituting the organic layer is at least one selected from compounds of the following general formula (5):

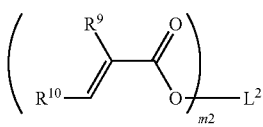

(wherein R⁹ represents a hydrogen atom or a methyl group; R¹⁰ represents a hydrogen atom; L² represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m2 indicates an integer of from 1 to 6; when m2 is 2 or more, R⁹'s and R¹⁰'s each may be the same or different).

(22) The method for sealing a device of any one of (12) to (21), wherein the device is an electronic device.

(23) The method for sealing a device of any one of (12) to (21), wherein the device is an organic EL device.

Description of Specific Embodiments

The contents of the invention are described in detail hereinunder. In this description, the numerical range expressed by the wording "a number to another number" means the range that falls between the former number indicating the lowermost limit of the range and the latter number indicating the uppermost limit thereof. "Organic EL device" as referred to herein means an organic electroluminescent device.

The barrier laminate of the invention comprises at lest one organic layer and at least one inorganic layer, and the organic layer satisfies at lease any one requirement of the following (1) and (2):

(1) The organic layer is formed by vacuum vapor deposition of a composition containing a radical-polymerizing monomer and a polymerization initiator, wherein the polymerization initiator is liquid at 30° C. under one atmosphere, followed by curing the composition.

(2) The organic layer is formed by vacuum vapor deposition of a composition containing a radical-polymerizing monomer and a polymerization initiator having a melting point of not higher than 30° C., followed by curing the composition.

The barrier laminate of the invention may contain an organic area and an inorganic area in which the boundary between the organic layer and the inorganic layer is indefinite. For simplifying the description hereinunder, the organic layer and the organic area are referred to as "organic layer"; and the inorganic layer and the inorganic area are referred to as "inorganic layer". In case where the barrier laminate comprises plural organic layers and inorganic layers, in general, it is desirable that the organic layers and the inorganic layers are alternately laminated to constitute the barrier laminate.

In case where the barrier laminate comprises a constitution of an organic area and an inorganic area, the areas may form a gradation material layer where the areas continuously change in the thickness direction of the laminate. As examples of the gradation material, there are mentioned materials described in Kim et al's report, Journal of Vacuum Science and Technology A, Vol. 23 pp. 971-977 (2005 American Vacuum Society); and gradation layers of an organic layer and an inorganic layer laminated with no boundary therebetween as in US Laid-Open 2004-46497.

The laminate of the invention may have any other functional layer than the organic layer and the inorganic layer. The functional layer includes a mat agent layer, a protective layer, an antistatic layer, a planarizing layer, an adhesiveness enhancing layer, a light shielding layer, an antireflection layer, a hard coat layer, a stress relaxation layer, an antifogging layer, an anti-soiling layer, a printable layer, etc.

(Organic Layer)

The organic layer in the invention is a polymer layer formed by curing a radical-polymerizing monomer. Concretely, it is a layer of a thermoplastic resin such as polyester, acrylic resin, methacrylic resin (in this description, acrylic resin and methacrylic resin may be referred to as acrylate polymer), methacrylic acid/maleic acid copolymer, polystyrene, transparent fluororesin, polyimide, fluoropolyimide, polyamide, polyamidimide, polyetherimide, cellulose acylate, polyurethane, polyether ether ketone, polycarbonate, alicyclic polyolefin, polyarylate, polyether sulfone, polysulfone, fluorene ring-modified polycarbonate, alicyclic-modified polycarbonate, fluorene ring-modified polyester, acryloyl compound, and polysiloxane or any other organic silicon compound. The organic layer may be formed of a single material or a mixture of plural materials. Two or more organic layers may be laminated.

Preferably, the organic layer in the invention is formed by curing at least one radical-polymerizing monomer of the following general formula (4) or (5):

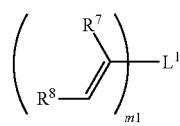

(wherein R⁷ represents a hydrogen atom or a methyl group; R⁸ represents a hydrogen atom; L¹ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m1 indicates an integer of from 1 to 6; when m1 is 2 or more, R⁷'s and R⁸'s each may be the same or different).

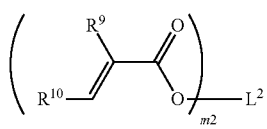
(5)

(wherein $R^9$ represents a hydrogen atom or a methyl group; $R^{10}$ represents a hydrogen atom; $L^2$ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m2 indicates an integer of from 1 to 6; when m2 is 2 or more, $R^9$'s and $R^{10}$'s each may be the same or different).

Preferably, the organic layer in the invention comprises, as the main ingredient thereof, an acrylate polymer of a polymerizing monomer of the above formula (5). The main ingredient as referred to herein is meant the polymerizing monomer of which the content is the largest of the polymerizing monomers constituting the organic layer; and in general, its content is generally at least 80% by mass. The acrylate polymer is a polymer having a structural unit of the following general formula (6):

$(Z-COO)_n-L$ (6)

In formula (6), Z represents any of the following (a) or (b); $R^{11}$ and $R^{12}$ in the structures each independently represent a hydrogen atom or a methyl group; * indicates the position at which the formula (6) bonds to the carbonyl group; L represents an n-valent linking group; n indicates an integer of from 1 to 6; and n Z's may be the same or different, but at least one Z is represented by the following (a):

Preferably, L has from 3 to 18 carbon atoms, more preferably from 4 to 17, even more preferably from 5 to 16, still more preferably from 6 to 15 carbon atoms.

When n is 2, L is a divalent linking group. Examples of the divalent linking group include an alkylene group (e.g., 1,3-propylene group, 2,2-dimethyl-1,3-propylene group, 2-butyl-2-ethyl-1,3-propylene group, 1,6-hexylene group, 1,9-nonylene group, 1,12-dodecylene group, 1,16-hexadecylene group), an ether group, an imino group, a carbonyl group, and a divalent residue comprising any of those divalent groups bonding to each other in series (e.g., polyethyleneoxy group, polypropyleneoxy group, propionyloxyethylene group, butyroyloxypropylene group, caproyloxyethylene group, caproyloxybutylene group).

Of those, an alkylene group is preferred.

L may have a substituent. Examples of the substituent with which L may be substituted include an alkyl group (e.g., methyl group, ethyl group, butyl group), an aryl group (e.g., phenyl group), an amino group (e.g., amino group, methylamino group, dimethylamino group, diethylamino group), an alkoxy group (e.g., methoxy group, ethoxy group, butoxy group, 2-ethylhexyloxy group), an acyl group (e.g., acetyl group, benzoyl group, formyl group, pivaloyl group), an alkoxycarbonyl group (e.g., methoxycarbonyl group, ethoxycarbonyl group), a hydroxy group, a halogen atom (e.g., fluorine atom, chlorine atom, bromine atom, iodine atom), and a cyano group. Preferably, the substituent does not have an oxygen-containing functional group for the reasons mentioned below, and more preferred is an alkyl group.

Specifically, when n is 2, L is most preferably an alkylene group not having an oxygen-containing functional group. Employing the substituent makes it possible to lower the water vapor permeability of the laminate of the invention.

When n is 3, L is a trivalent linking group. Examples of the trivalent linking group include a trivalent residue to be derived from the above-mentioned divalent linking group by removing one hydrogen atom therefrom, or a trivalent residue to be derived from the above-mentioned divalent linking group by removing one hydrogen atom therefrom followed by substituting it with any of an alkylene group, an ether group, a carbonyl group and a divalent group comprising any of those divalent groups bonding to each other in series. Of those, preferred is a trivalent residue not having an oxygen-containing functional group, which is derived from an alkylene group by removing one hydrogen atom therefrom. Employing the residue makes it possible to lower the water vapor permeability of the laminate of the invention.

When n is 4 or more, L is a tetravalent or more polyvalent linking group. Examples of the tetravalent or more polyvalent linking group may be mentioned similarly to the above. Its preferred examples may also be mentioned similarly to the above. In particular, preferred is a tetravalent residue not having an oxygen-containing functional group, which is derived from an alkylene group by removing two hydrogen atoms therefrom. Employing the residue makes it possible to lower the water vapor permeability of the laminate of the invention.

The polymer may have any other structural unit than those of formula (6). For example, it may have a structural unit to be formed by copolymerization of an acrylate monomer or a methacrylate monomer with any others. In the polymer, the content of the structural unit not represented by the formula (6) is preferably at most 20% by mass, more preferably at most 15% by mass, even more preferably at most 10% by mass. The polymer not having the structural unit of formula (6) includes, for example, polyester, methacrylic acid/maleic acid copolymer, polystyrene, transparent fluororesin, polyimide, fluoropolyimide, polyamide, polyamidimide, polyether imide, cellulose acylate, polyurethane, polyether ketone, polycarbonate, alicyclic polyolefin, polyarylate, polyether sulfone, polysulfone, fluorene ring-modified polycarbonate, alicyclic-modified polycarbonate, and fluorene ring-modified polyester.

Specific examples of the polymerizing monomer of formula (5) are mentioned below, to which, however, the invention should not be limited.

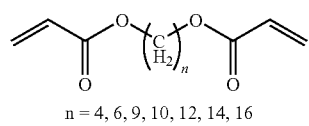
n = 4, 6, 9, 10, 12, 14, 16
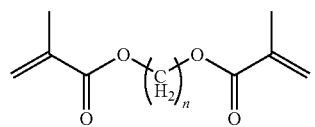
n = 4, 6, 9, 10, 12, 14, 16
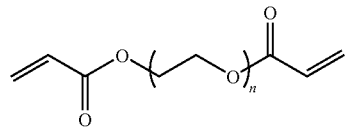
n = 2, 3, 4, 5
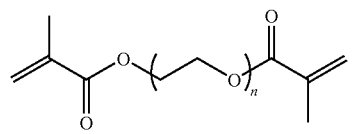
n = 2, 3, 4, 5
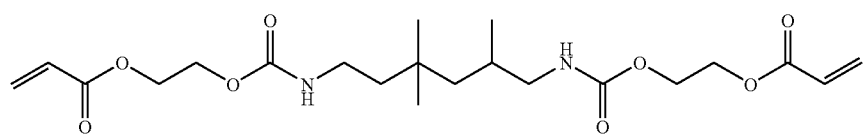
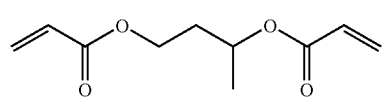
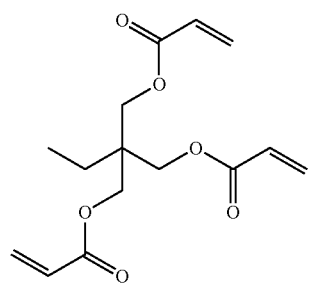
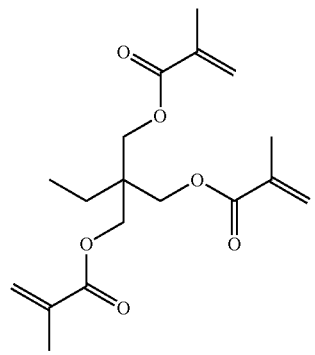
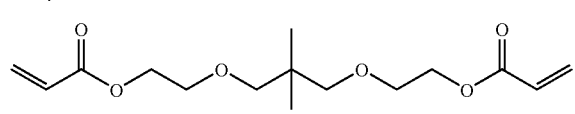
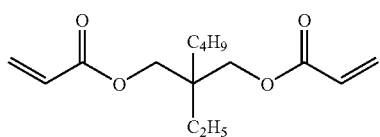
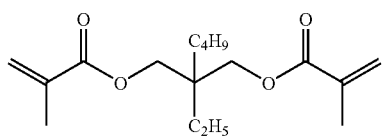
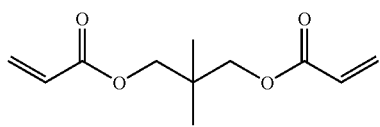
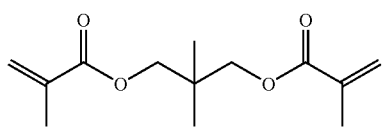
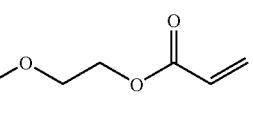
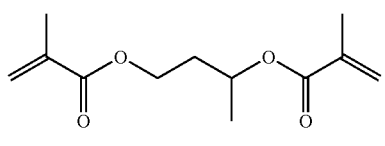
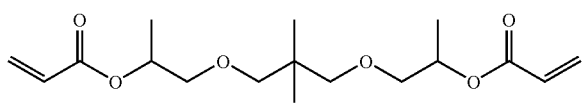
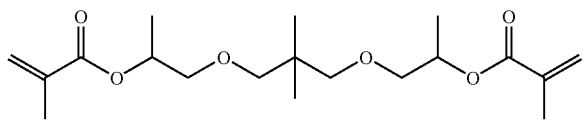
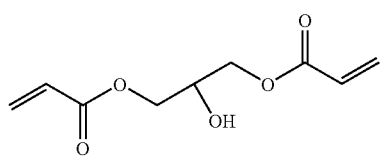

11
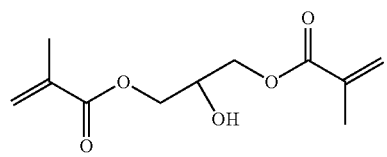
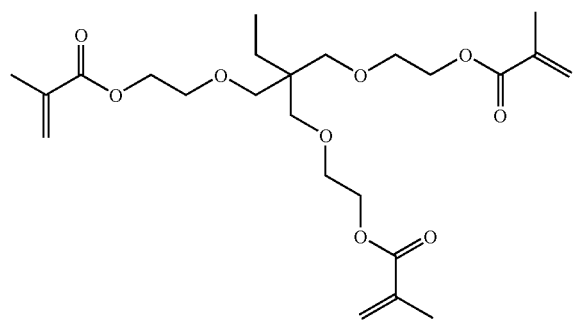
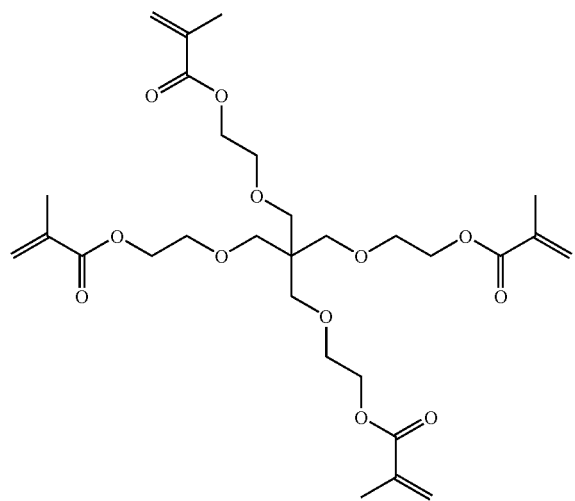
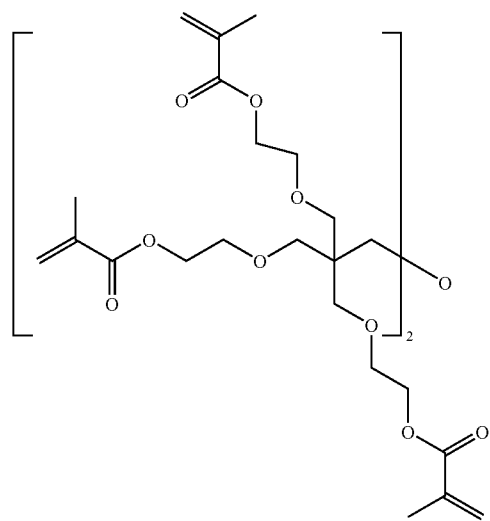
12
-continued
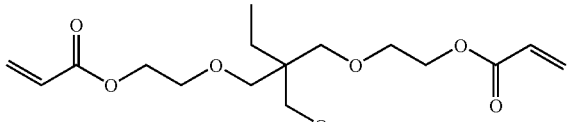
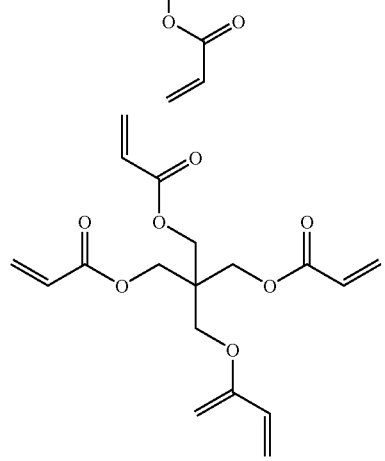
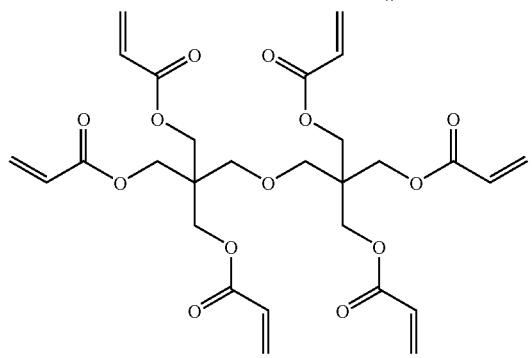

-continued
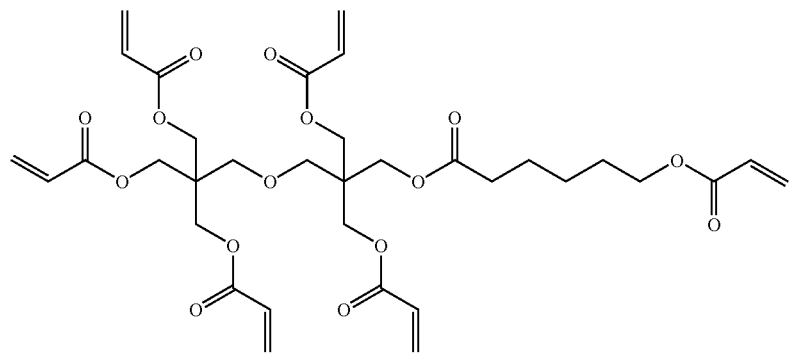
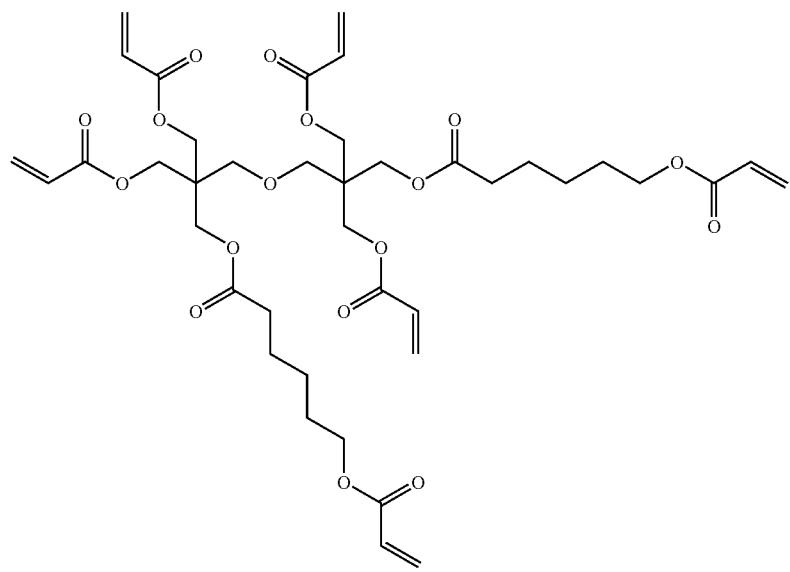
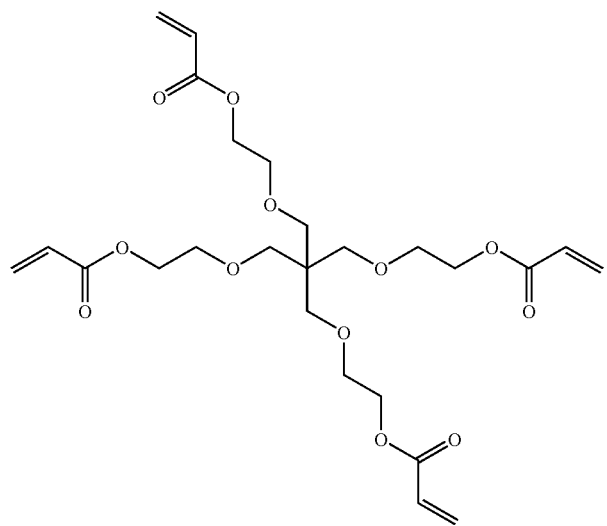

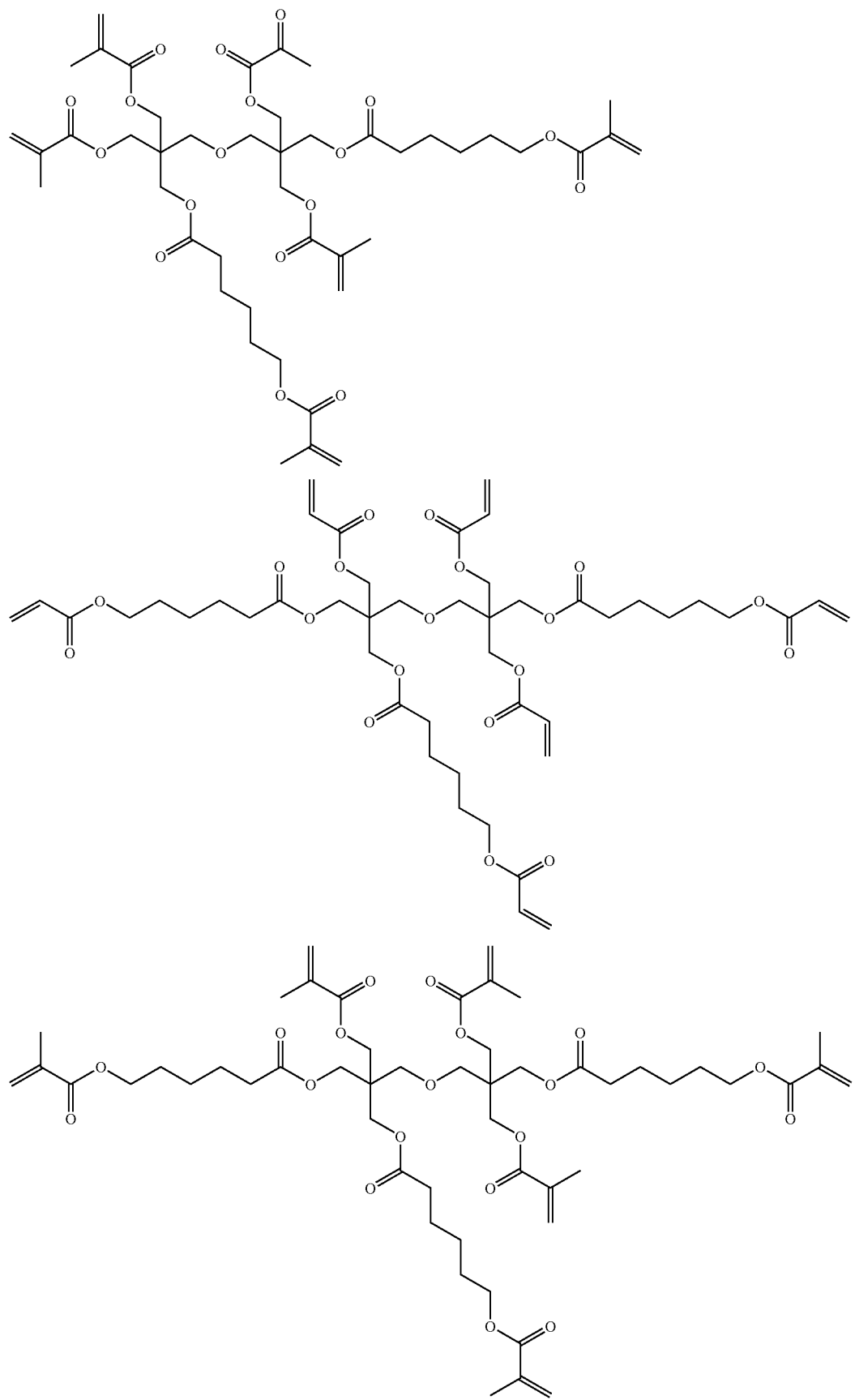

-continued

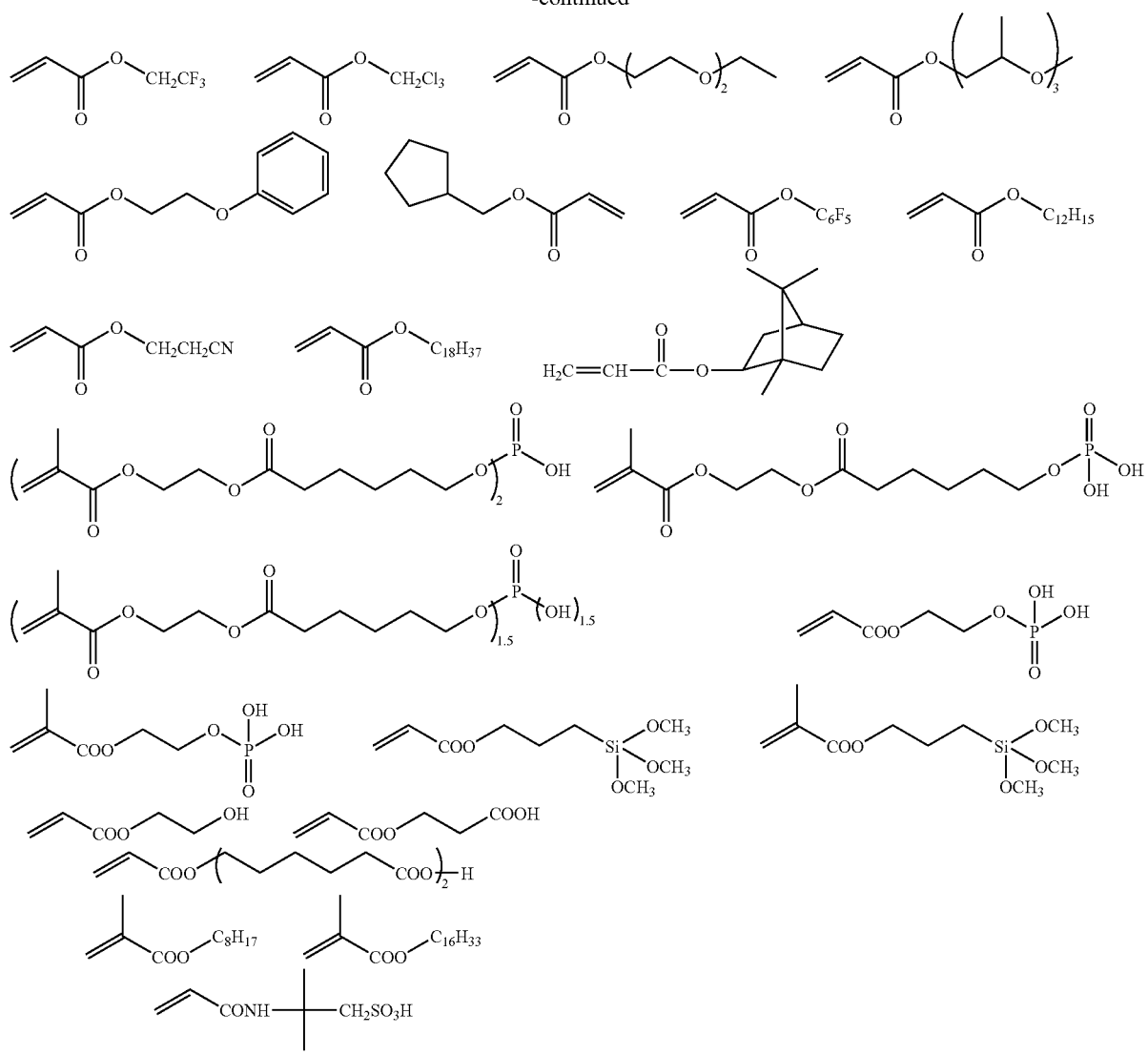

The monomer mixture for use in the invention may contain a phosphoric acid-based (meth)acrylate monomer or a silane coupling group-containing (meth)acrylate monomer for enhancing the adhesiveness of the layer. The amount of the monomer of the type to be added may be so determined, depending on the number of the functional groups therein, that it may correspond to the above-mentioned amount of the monomer to be added.

Preferred examples of the phosphoric acid-based monomer or the silane coupling group-containing monomer are mentioned below, to which, however, the monomers usable in the invention should not be limited.

-continued

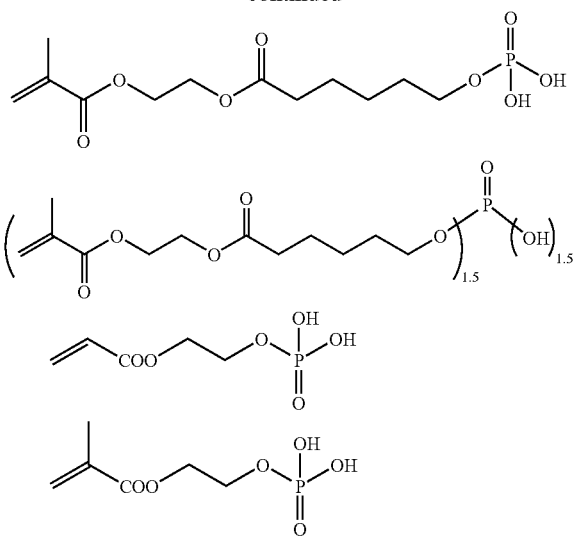

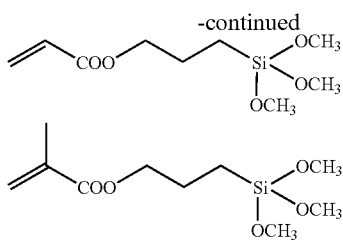

For forming the organic layer, a vacuum vapor deposition method is employed in the invention. The vacuum vapor deposition method is not specifically defined, for which, for example, preferred are a flash vapor deposition method and a plasma CVD method as in U.S. Pat. Nos. 4,842,893, 4,954,371 and 5,032,461. Especially preferred is a flash vapor deposition method as having an effect of lowering the dissolved oxygen in monomer and capable of increasing the degree of monomer conversion in polymerization.

The monomer polymerization method is not specifically defined, for which, for example, preferred is thermal polymerization, light (UV, visible light) polymerization, electron beam polymerization, plasma polymerization, or their combination. Of those, especially preferred is photopolymerization.

The light for irradiation is generally UV light from high-pressure mercy lamp or low-pressure mercy lamp. The irradiation energy is preferably at least 0.5 J/cm$^2$, more preferably at least 2 J/cm$^2$. Since acrylates and methacrylates receive polymerization inhibition by oxygen in air, it is desirable that the oxygen concentration or the oxygen partial pressure during the monomer polymerization is reduced. For this, employable is an inert gas purging method (e.g., nitrogen gas purging method, argon purging method), or a pressure reducing method. Of those, a reduced-pressure curing method is more favorable as having an effect of lowering the dissolved oxygen concentration in monomer.

In case where the oxygen concentration in polymerization is reduced according to a nitrogen purging method, the oxygen concentration is preferably at most 2%, more preferably at most 0.5%. In case where the oxygen partial pressure is reduced according to a pressure reducing method, the total pressure is preferably at most 1000 Pa, more preferably at most 100 Pa. Especially preferred is UV polymerization with energy irradiation of at least 2 J/cm$^2$ under a reduced pressure condition of at most 100 Pa. Most preferably, the monomer film formed according to a flash vapor deposition method is UV-polymerized by energy irradiation of at least 2 J/cm$^2$ under reduced pressure condition. Taking this method makes it possible to increase the monomer conversion in polymerization to thereby form an organic layer having a high hardness. Preferably, the monomer polymerization is attained after the monomer mixture has been positioned in the intended site by vapor deposition.

Preferably, the degree of monomer conversion in polymerization is at least 85%, more preferably at least 88%, even more preferably at least 90%, still more preferably at least 92%. The conversion in polymerization as referred to herein means the ratio of the reacted polymerizing group to all the polymerizing groups (acryloyl group and methacryloyl group) in the monomer mixture. The conversion in polymerization may be determined according to an IR absorptiometric method.

The thickness of the organic layer is not specifically defined. However, when too thin, the layer could not be uniform; but when too thick, the layer may be cracked and its barrier capability may lower. From these viewpoints, the thickness of the organic layer is preferably from 50 nm to 2000 nm, more preferably from 200 nm to 1500 nm.

Preferably, the organic layer is smooth as so mentioned in the above. Preferably, the smoothness of the organic layer is on a level of at most 2 nm, more preferably at most 1 nm in terms of the mean roughness (Ra value) in 10 μm square. The organic layer is required to have neither impurities such as particles nor projections in the surface thereof. Accordingly, it is desirable that the organic layer is formed in a clean room. Preferably, the degree of cleanness is at most class 10000, more preferably at most class 1000.

Two or more organic layers may be laminated. In this case, the layers may have the same composition or different compositions. In case where two or more layers are laminated, the individual organic layers are preferably so designed that they fall within the above-mentioned preferred ranges.

(Polymerization Initiator)

The barrier laminate of the invention is characterized in that the organic layer therein is formed by vacuum vapor deposition of a composition containing a radical-polymerizing monomer and a polymerization initiator, followed by curing the composition The polymerization initiator for use in the invention is a polymerization initiator that has a melting point of not higher than 30° C., or a polymerization initiator that is liquid at 30° C. under one atmosphere. The melting point as referred to herein means a temperature at which a substance changes from a solid state to a liquid state. "Liquid" means that when a container with the polymerization initiator therein at 30° C. under one atmosphere is inclined, it shows flowability.

One or more different types of polymerization initiators may be used in the invention either singly or as combined. For example, two or more polymerization initiators that can be liquid when mixed are favorably used in the invention.

The polymerization initiator of the type can be actually liquid in forming the organic layer by vacuum vapor deposition, and therefore a small amount of the polymerization initiator can well cure the radical-polymerizing monomer. In addition, in the thus-stabilized organic layer, the remaining polymerizing monomer and polymerization initiator are hardly released into the adjacent inorganic layer and others, and therefore the inorganic layer can be protected from defoaming breakage.

In the invention, the amount of the remaining polymerizing monomer in the organic layer is preferably at most 5% by weight.

Preferably, the polymerization initiator for use in the invention has a molecular weight of at least 170, more preferably at least 190. Since the polymerization initiator having such a large molecular weight is used, it hardly evaporates away, and a stably cured organic layer is therefore easy to form. Not specifically defined, the uppermost limit of the molecular weight of the polymerization initiator may be generally at most 500.

Preferably, the proportion of the polymerization initiator in the composition to form the organic layer, comprising a radical-polymerizing monomer and the polymerization initiator, is at most 2% by weight, more preferably at most 1% by weight. In the invention, the organic layer can be formed by vacuum vapor deposition, and therefore, even though the amount of the polymerization initiator to be added to the layer-forming composition is reduced as compared with that in a case of forming the organic layer by solution coating, the polymerizing monomer may be well reacted to form the layer, and accordingly, the amount of the polymerization initiator to be used in the invention can be reduced. Since the amount of the polymerization initiator to be added can be reduced, the amount of the remaining polymerization initiator can also be reduced therefore resulting in that the polymerization initiator-derived gas can be reduced and the damage to the adjacent inorganic layers and others can also be reduced.

The polymerization initiator for use in the invention comprises at least one of compounds of the following general formula (1) or compounds of the following general formula (2):

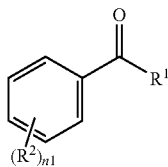

(In formula (1), $R^1$ represents a substituted or unsubstituted alkyl group having from 1 to 18 carbon atoms, a substituted or unsubstituted aryl group having from 1 to 18 carbon atoms, a carbonyl group, or a substituent comprising any two or more such groups bonding to each other; $R^2$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n1 indicates an integer of from 0 to 5; when n1 is 2 or more, $R^2$'s may be the same or different).

$R^1$ is preferably a substituted or unsubstituted alkyl group having from 1 to 18 carbon atoms, or a substituted or unsubstituted aryl group having from 1 to 18 carbon atoms; $R^2$ is preferably a substituted or unsubstituted alkyl group having from 1 to 18 carbon atoms. In case where $R^1$ is a substituted alkyl group having from 1 to 18 carbon atoms, preferably, the carbon atom thereof bonding to the carbonyl group is substituted with an alkoxy group, a hydroxyl group or an amino group. n1 is preferably from 0 to 3.

As these compounds, for example, usable are commercial products such as Darocur 1173 (by Ciba Speciality Chemicals)

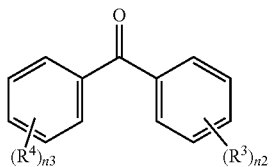

(wherein $R^3$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; $R^4$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n2 and n3 each indicate an integer of from 0 to 5, but both n2 and n3 are not 0 at the same time; when n2 is 2 or more, $R^3$'s may be the same or different; and when n3 is 2 or more, $R^4$'s may be the same or different).

$R^3$ is preferably a substituted or unsubstituted alkyl group having from 1 to 18 carbon atoms; and $R^4$ is preferably a substituted or unsubstituted alkyl group having from 1 to 18 carbon atoms. n2 is preferably from 0 to 3; and n3 is preferably from 0 to 3.

The compounds include 2-methylbenzophenone and others; and for example, commercial products such as Esacure TZT (by Lamberti) can be used.

(Inorganic Layer)

The inorganic layer is, in general, a layer of a thin film formed of a metal compound. For forming the inorganic layer, employable is any method capable of producing the intended thin film. For it, for example, suitable are physical vapor deposition methods (PVD) such as vapor evaporation method, sputtering method, ion plating method; various chemical vapor deposition methods (CVD); liquid phase growth methods such as plating or sol-gel method. Of those, preferred are physical vapor deposition methods (PVD) and chemical vapor deposition methods (CVD), which may evade thermal influences on the substrate film in inorganic layer formation, and which may readily produce uniform thin film layers at rapid production speed. Not specifically defined, the component to be in the inorganic layer may be any one satisfies the above-mentioned requirements. For example, it includes oxides, nitrides or oxinitrides containing at least one metal selected from Si, Al, In, Sn, Zn, Ti, Cu, Ce and Ta. Of those, preferred are oxides, nitrides or oxinitrides of a metal selected from Si, Al, In, Sn, Zn and Ti; more preferred are metal oxides, nitrides or oxinitrides with Si or Al. These may contain any other element as a subsidiary component.

In the invention, the inorganic layer is formed on the above-mentioned, smooth and hard organic layer, and therefore, the inorganic layer thus formed thereon may have a smooth surface. Accordingly, even though the thickness of the inorganic layer is thin, the laminate may secure good barrier capability. The effect results from the organic layer satisfying the two requirements of smoothness and hardness. For example, when a sputtering method is employed for inorganic layer formation, the inorganic substance to be deposited on the organic layer has kinetic energy. Accordingly, in case where the inorganic layer is to be formed on a smooth but soft organic layer, the surface of the organic layer may be roughened by the shock of the inorganic substance being deposited thereon, and therefore the surface smoothness of the inorganic layer formed may be worsened. In the invention, since the organic layer is smooth and hard, it can bear the shock, therefore realizing the formation of the inorganic layer that is smooth and thin and has good barrier capability.

Preferably, the surface smoothness of the inorganic layer formed in the invention is less than 2 nm in terms of the mean roughness (Ra value) in 10 μm square, more preferably at most 1 nm. Accordingly, it is desirable that the inorganic layer is formed in a clean room. Preferably, the degree of cleanness is at most class 10000, more preferably at most class 1000.

Not specifically defined, the thickness of the inorganic layer is generally within a range of from 5 to 500 nm/layer. The laminate and the barrier film substrate of the invention exhibit good barrier property even though the inorganic layer therein is thin, and therefore, the inorganic layer is preferably as thin as possible for increasing the producibility and for reducing the cost. The thickness of the inorganic layer is preferably from 20 to 200 nm.

Two or more inorganic layers may be laminated. In such a case, the individual layers may have the same composition or different compositions. In case where two or more layers are laminated, it is desirable that the individual inorganic layers are so designed as to fall within the above-mentioned preferred ranges.

(Lamination of Organic Layer and Inorganic Layer)

The organic layer and the inorganic layer may be laminated by repeated film formation to form the organic layer and the inorganic layer in a desired layer constitution. In case where the inorganic layer is formed according to a vacuum film formation method such as sputtering method, vacuum evaporation method, ion plating method or plasma CVD method, then it is desirable that the organic layer is also formed according to a vacuum film formation method such as the above-mentioned flash vapor deposition method. While the barrier layer is formed, it is especially desirable that the organic layer and the inorganic layer are laminated all the time in a vacuum of at most 1000 Pa, not restoring the pressure to an atmospheric pressure during the film formation. More preferably, the pressure is at most 100 Pa, even more preferably at most 50 Pa, still more preferably at most 20 Pa.

(Use of Barrier Laminate)

In general, the barrier laminate of the invention is formed on a support. Selecting the support, the barrier laminate may have various applications. The support includes a substrate film, as well as various devices, optical members, etc. The barrier laminate of the invention may be used for sealing up devices that require gas-barrier performance such as electronic devices.

<Device>

The barrier laminate of the invention are favorably used for devices that are deteriorated by the chemical components in air (e.g., oxygen, water, nitrogen oxide, sulfur oxide, ozone). Examples of the devices are, for example, organic EL devices, liquid-crystal display devices, thin-film transistors, touch panels, electronic papers, solar cells, other electronic devices. More preferred are organic EL devices.

The barrier laminate of the invention preferably is used for film-sealing of devices. Specifically, this is a method of providing a barrier laminate of the invention on the surface of a device serving as a support by itself. Before providing the barrier laminate, the device may be covered with a protective layer.

(Organic EL Device)

Examples of an organic EL device with a barrier film substrate are described in detail in JP-A 2007-30387.

(Others)

Other applications of the invention are thin-film transistors as in JP-T 10-512104, touch panels as in JP-A 5-127822, 2002-48913, electronic papers as in JP-A 2000-98326, and solar cells as in Japanese Patent Application No. 7-160334.

EXAMPLES

The characteristics of the invention are described more concretely with reference to the following Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Example 1

1. Formation of Organic EL Device:
(1-1) Formation of Organic EL Device:

An ITO film-having conductive glass substrate (surface resistivity, 10 Ω/square) was washed with 2-propanol, and then processed for UV-ozone treatment for 10 minutes. The following organic compound layers were formed in order on the substrate (anode) according to a vacuum vapor deposition method.

(First Hole Transportation Layer)
Copper Phthalocyanine thickness 10 nm
(Second Hole Transportation Layer)
N,N'-diphenyl-N,N'-dinaphthylbenzidine thickness 40 nm
(Light Emission Layer Serving Also as Electron Transportation Layer)
Tris(8-hydroxyquinolinato)aluminium thickness 60 nm Finally, lithium fluoride was vapor-deposited in a thickness of 1 nm and metal aluminium was in a thickness of 100 nm in that order, serving as a cathode. On this, a silicon nitride film having a thickness of 5 μm was formed according to a parallel plate CVD method, thereby constructing an organic EL device.

2. Formation of Gas-Barrier Laminate:

Using a polymerization initiator shown in Table 1, a barrier laminate of samples Nos. 101 to 111 shown in Table 2 was formed on the silicon nitride film of the organic EL device constructed in the above 1. The process for formation is mentioned below.

(2-1) Formation of Organic Layer:

Using an organic/inorganic laminate film formation device (Vitex Systems' Guardian 200), an organic layer was formed. In this device, an organic layer and an inorganic layer are formed continuously all in vacuum, and therefore, the barrier laminate to be produced therein is not exposed to open air until the completion of its production. The organic layer formation method using this device is flash vapor deposition under an inner pressure of 3 Pa, and the UV irradiation energy for polymerization is 2 J/cm$^2$. As the starting material for the organic layer, used was a mixed solution of BEPGA (60 g), TMPTA (40 g), and a UV polymerization initiator. The polymerization initiator used and the amount thereof are shown in Table 1.

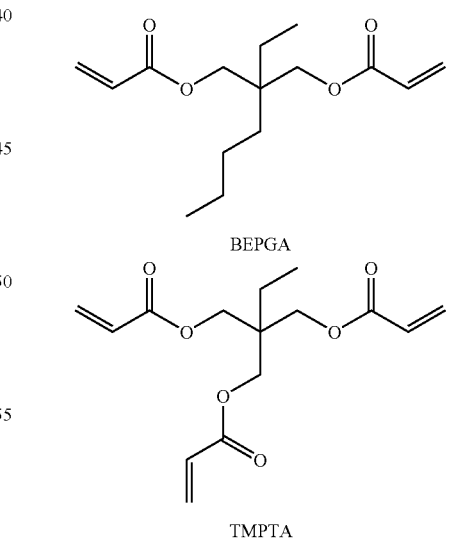

BEPGA

TMPTA (2-2) Formation of Inorganic Layer:

Subsequently using Guardian 200 used in (1-1), an inorganic layer was formed. After the formation of the organic layer, the samples were not released from the vacuum condition and the organic layer and the inorganic layer of the samples were continuously formed all in the vacuum device.

The inorganic layer was formed in a mode of aluminium film formation according to a reactive sputtering method under direct current pulse application, in which the target is aluminium and the reactive gas is oxygen. The formed inorganic layer (aluminium oxide) had a thickness of 60 nm.

3. Evaluation of Polymerization Initiator:
(Determination of Morphology at Room Temperature)

Under the condition of one atmosphere at 30° C., a container with the polymerization initiator to be tested therein was gently inclined by about 15 degrees, and left as such for about 10 minutes, whereupon the sample showing flowability and running in the container was judged liquid.

(Method of Determination of Molecular Weight)

A mixed polymerization initiator of two or more compounds was determined as follows: The molecular weight of each compound was multiplied by the content thereof, and the data were summed up to give the mean molecular weight of the mixture. In case where the content is unknown, the molecular weight of the mixture was defined within the range of the molecular weight of the initiator compounds constituting the mixture.

4. Evaluation of Organic EL Device:
(4-1) Installation of Gas-Barrier Film on Organic EL Device:

According to the process of the above 1 and 2, a gas-barrier laminate having the layer constitution shown in Table 2 (in which Y is an organic layer, and X is an inorganic layer) was disposed on an organic EL device (D). 20 samples of every organic EL device were thus produced.

(4-2) Evaluation of Light-Emitting Surface of Organic EL Device:

Immediately after their production, the organic EL devices were driven for light emission at a voltage of 7V applied thereto, using a source measure unit, Keithley's SMU2400 Model. Using a microscope, the surface of each sample was checked for its condition with light emission, and the initial failure rate of the samples, defined as follows, is shown in Table 2.

Next, the devices were kept in a dark room at 60° C. and a relative humidity of 90% for 500 hours, and checked for the surface condition with light emission. The proportion of the samples having dark spots larger than 300 μm in diameter was defined as a failure rate. Table 2 shows the failure rate of each tested device.

As is obvious from the results in Table 2, it is known that the organic EL device sealed up with the gas-barrier laminate of the invention (Samples 101 to 104 and Samples 108 to 111) has a low initial failure rate and is excellent in wet heat durability. In addition, it is known that the gas-barrier laminate of the invention for which the amount of the polymerization initiator material used is small brings about a low failure rate when applied to an organic EL device, and is especially favorable.

TABLE 1

| Polymerization Initiator | | | | |
|---|---|---|---|---|
| substance name/trade name | manufacturer | Melting Point (° C.) | Morphology at room temperature | Molecular Weight |
| Esacure TZT | Lamberti | unknown | liquid | 196.24 to 224.30 |
| Darocur 1173 | Ciba Speciality Chemicals | 4 | liquid | 164.20 |
| Irgacure 1000 | Ciba Speciality Chemicals | <4 | liquid | 172.21 |
| Irgacure 500 | Ciba Speciality Chemicals | about 18 | liquid | 193.24 |
| benzophenone | Aldrich | 45 to 49 | powder | 182.22 |
| Irgacure 651 | Ciba Speciality Chemicals | 64 to 67 | powder | 256.30 |
| Irgacure 184 | Ciba Speciality Chemicals | 45 to 49 | powder | 204.26 |

TABLE 2

| | Polymerization Initiator | | | Failure Rate | |
|---|---|---|---|---|---|
| Sample No. | substance name/trade name | amount | Layer Constitution | initial | aged |
| 101 (the invention) | Esacure TZT | 1.5 g | D/Y/X/Y/X/Y/X/Y/X/Y | 0% | 5% |
| 102 (the invention) | Darocur 1173 | 1.5 g | D/Y/X/Y/X/Y/X/Y/X/Y | 0% | 20% |
| 103 (the invention) | Irgacure 1000 | 1.5 g | D/Y/X/Y/X/Y/X/Y/X/Y | 0% | 15% |
| 104 (the invention) | Irgacure 500 | 1.5 g | D/Y/X/Y/X/Y/X/Y/X/Y | 0% | 10% |
| 105 (comparative example) | benzophenone | 1.5 g | D/Y/X/Y/X/Y/X/Y/X/Y | 10% | 90% |
| 106 (comparative example) | Irgacure 651 | 1.5 g | D/Y/X/Y/X/Y/X/Y/X/Y | 5% | 80% |
| 107 (comparative example) | Irgacure 184 | 1.5 g | D/Y/X/Y/X/Y/X/Y/X/Y | 5% | 85% |
| 108 (the invention) | Esacure TZT | 0.6 g | D/Y/X/Y/X/Y/X/Y/X | 0% | 0% |
| 109 (the invention) | Esacure TZT | 0.6 g | D/Y/X/Y/X/Y/X/Y/X/Y | 0% | 0% |
| 110 (the invention) | Esacure TZT | 0.6 g | D/X/Y/X/Y/X/Y/Y/X | 0% | 0% |
| 111 (the invention) | Esacure TZT | 2.3 g | D/X/Y/X/Y/X/Y/X/Y/X | 0% | 10% |

The structural formulae of the compounds used in the above are shown below.

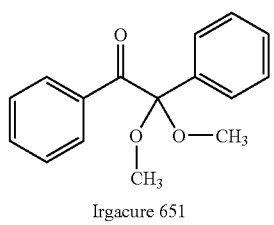

Irgacure 651

-continued

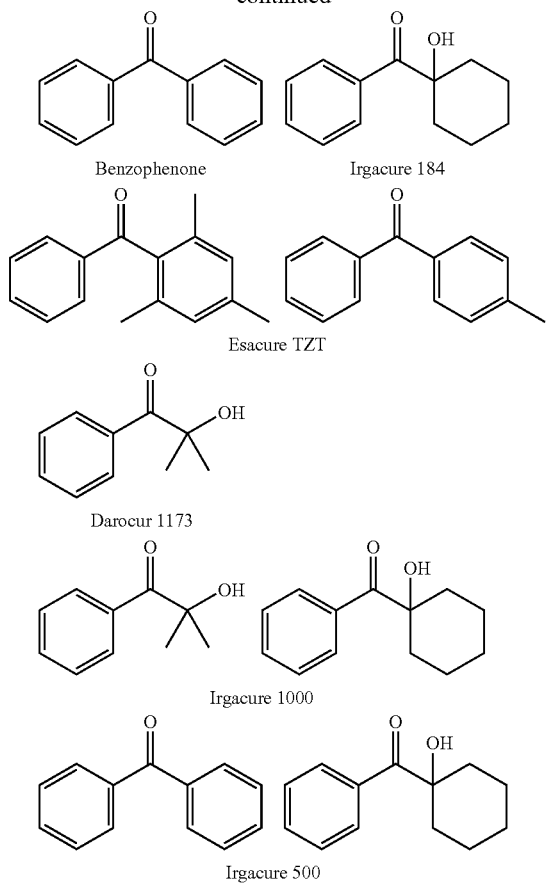

INDUSTRIAL APPLICABILITY

Heretofore in formation of the organic layer in a barrier laminate, a powdery polymerization is generally used and its use is said to be favorable. However, in the invention, a liquid polymerization initiator is used, and the invention has enabled stable polymerization of a polymerizing monomer even if the organic layer is formed by vacuum vapor deposition. The vacuum vapor deposition in forming the organic layer may reduce the amount of the polymerization initiator to be used and the amount thereof to be evaporated away during the layer formation, as compared with organic layer formation by solution coating. As a result, defoaming breakage of the inorganic layer owing to vaporization of the remaining polymerizing monomer and polymerization initiator can be prevented and the damage to devices can be minimized, and therefore the properties of the sealed devices can be thereby improved.

According to the invention, the organic layer constituting the barrier laminate can be stably cured even though it is formed through vacuum vapor deposition, and in addition, vapor release from the polymerizing monomer and the polymerization initiator remaining in the organic layer may be prevented. Specifically, in sealing a device with the barrier laminate of the invention, a technique of vacuum vapor deposition can be employed, and in addition, when the inorganic layer is formed, it may be protected from being defoamed or broken owing to vapor release from the remaining polymerizing monomer and polymerization initiator, and the damage to the device can be thereby minimized.

The present disclosure relates to the subject matter contained in Japanese Patent Application No.337414/2007 filed on Dec. 27, 2007, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A barrier laminate comprising at least one organic layer and at least one inorganic layer, wherein the organic layer is formed by vacuum vapor deposition of a composition containing a radical-polymerizing monomer and a polymerization initiator, followed by curing the composition, the polymerization initiator being liquid at 30° C. under one atmosphere and/or having a melting point of not higher than 30° C.;

wherein the composition contains the polymerization initiator in a ratio of at most 2% by weight; and wherein the composition contains 0.6 to 2.3 g of the polymerization initiator per 100 g of the radical-polymerizing monomer.

2. The barrier laminate of claim 1, wherein the molecular weight of the polymerization initiator is at least 170.

3. The barrier laminate of claim 1, wherein the polymerization initiator is at least one compound of the following general formula (1):

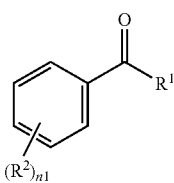

wherein $R^1$ represents a substituted or unsubstituted alkyl group having from 1 to 18 carbon atoms, a substituted or unsubstituted aryl group having from 1 to 18 carbon atoms, a carbonyl group, or a substituent comprising any two or more such groups bonding to each other; $R^2$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n1 indicates an integer of from 0 to 5; when n1 is 2 or more, $R^2$'s may be the same or different.

4. The barrier laminate of claim 1, wherein the polymerization initiator contains at least one compound of the following general formula (2):

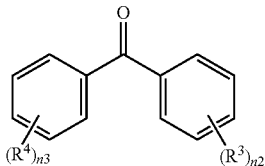

(2)

wherein $R^3$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; $R^4$ represents a substituted or unsubstituted alkyl group having from 1 to 18 carbon atoms, a substituted or unsubstituted aryl group having from 1 to 18 carbon atoms, an amino group, an alkoxy group, an acyl group, an alkoxycarbonyl group, an alkylthio group, an arylthio group, a hydroxy group, a halogen atom, or a cyano group; n2 and n3 each indicate an integer of from 0 to 5, but both n2 and n3 are not 0 at the same time; when n2 is 2 or more, $R^3$'s may be the same or different; and when n3 is 2 or more, $R^4$'s may be the same or different.

5. The barrier laminate of claim 1, wherein the organic layer is formed by flash vapor deposition.

6. The barrier laminate of claim 1, wherein the radical-polymerizing monomer constituting the organic layer is at least one selected from compounds of the following general formula (4):

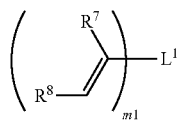

(4)

wherein $R^7$ represents a hydrogen atom or a methyl group; $R^8$ represents a hydrogen atom; $L^1$ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m1 indicates an integer of from 1 to 6; when m1 is 2 or more, $R^7$'s and $R^8$'s each may be the same or different.

7. The barrier laminate of claim 1, wherein the radical-polymerizing monomer constituting the organic layer is at least one selected from compounds of the following general formula (5):

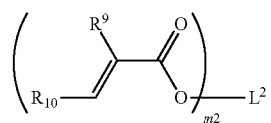

(5)

wherein $R^9$ represents a hydrogen atom or a methyl group; $R^{10}$ represents a hydrogen atom; $L^2$ represents a substituted or unsubstituted alkylene group having from 1 to 18 carbon atoms, a substituted or unsubstituted arylene group having from 1 to 18 carbon atoms, an ether group, an imino group, a carbonyl group, or a monovalent or polyvalent linking group comprising any of these groups bonding to each other in series; m2 indicates an integer of from 1 to 6; when m2 is 2 or more, $R^9$'s and $R^{10}$'s each may be the same or different.

* * * * *